United States Patent

[11] 3,575,498

| [72] | Inventor | Jacob L. Bohn<br>Glenside, Pa. |
|---|---|---|
| [21] | Appl. No. | 761,924 |
| [22] | Filed | Sept. 24, 1968 |
| [45] | Patented | Apr. 20, 1971 |
| [73] | Assignee | BNK Instrument Company<br>Philadelphia, Pa. |

[54] HIGH SPEED CAMERA
18 Claims, 12 Drawing Figs.

[52] U.S. Cl. .................................................. 352/84
[51] Int. Cl. .................................................. G03b 39/06
[50] Field of Search .................................... 352/84, 106; 95/36

[56] References Cited
UNITED STATES PATENTS

| 1,519,105 | 12/1924 | Bauersfeld .................. | 352/106 |
| 2,259,228 | 10/1941 | Rankin ...................... | 352/84X |
| 3,262,749 | 7/1966 | Nadig et al. ................ | 352/106 |
| 2,420,339 | 5/1947 | Rabinow ..................... | 95/36 |
| 3,270,646 | 9/1966 | Wilson ....................... | 95/36 |

Primary Examiner—Donald O. Woodiel
Attorney—Paul and Paul

ABSTRACT: A camera is provided, wherein light from an object to be photographed is transmitted through a lens system, in a path of travel, the light then passing through a novel means for creating slight changes in direction of the path of light travel, whereby light may be reflected from any of a plurality of reflective elements onto a recording device such as photographic film.

PATENTED APR 20 1971
3,575,498
SHEET 1 OF 3
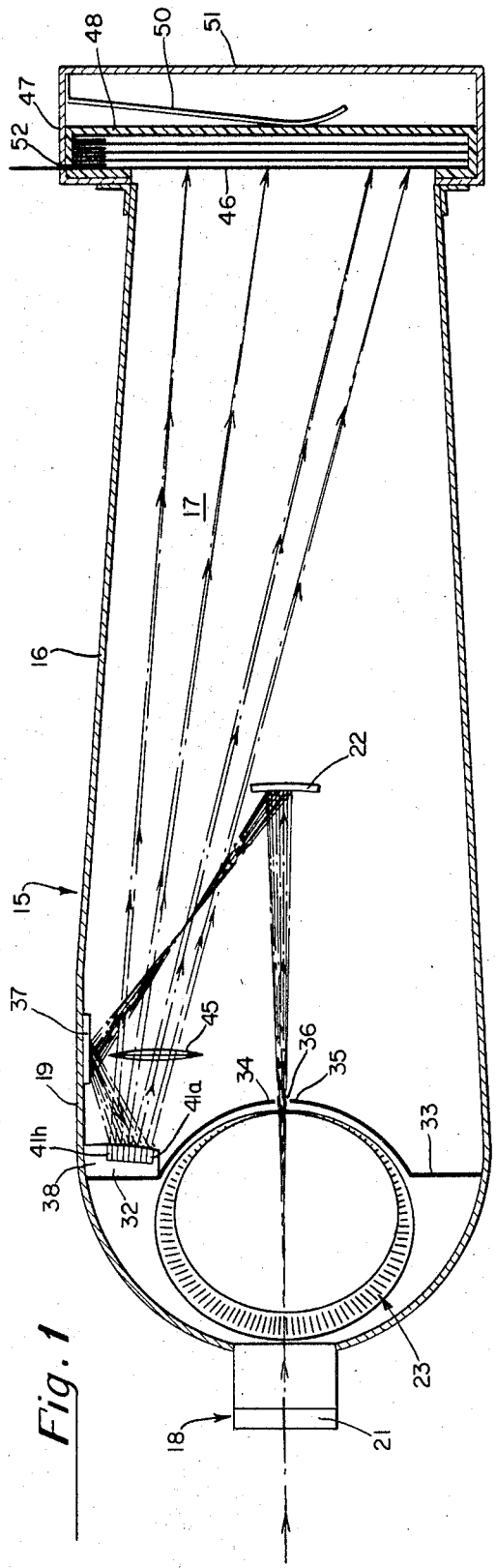
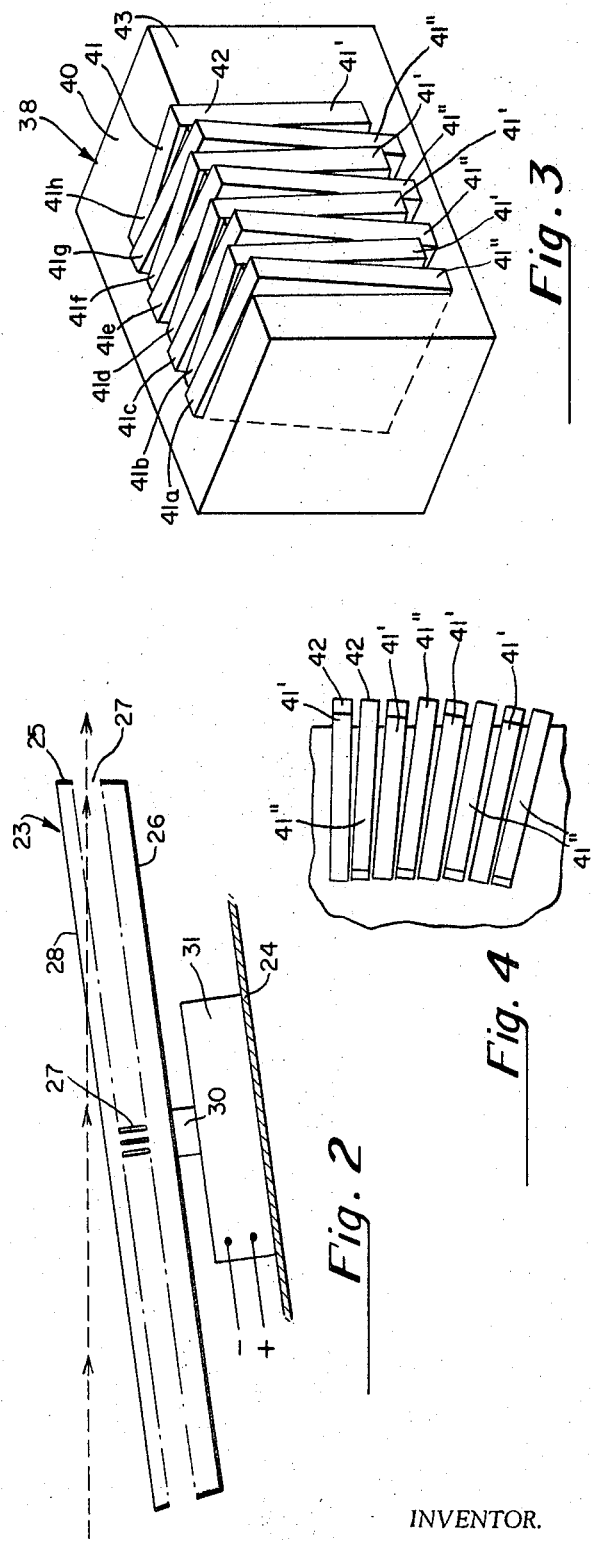
INVENTOR.
Jacob L. Bohn
BY
Paul + Paul
ATTORNEYS.

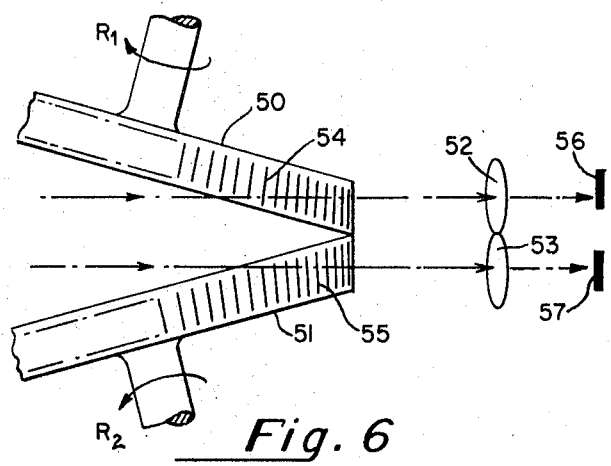
Fig. 6
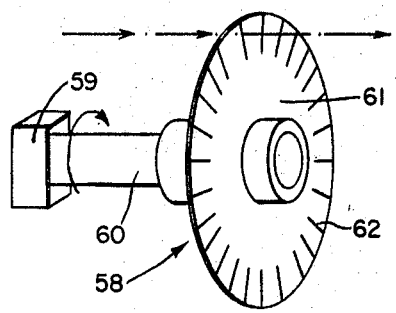
Fig. 7
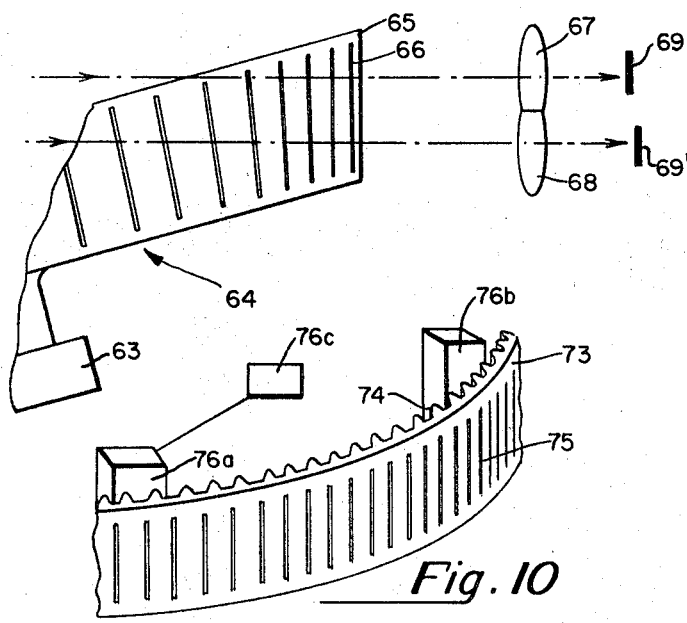
Fig. 8
Fig. 10
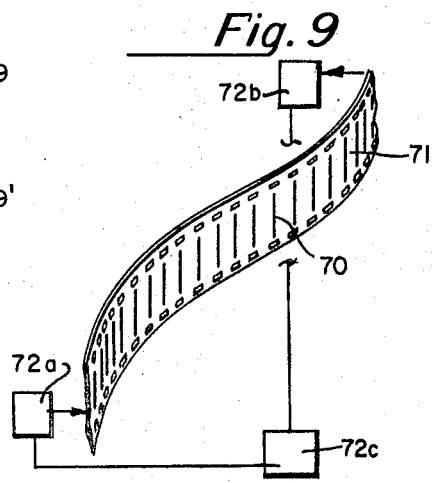
Fig. 9
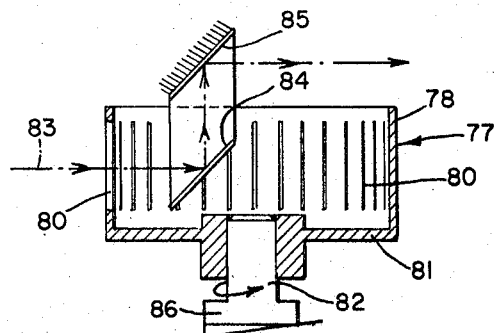
Fig. 11
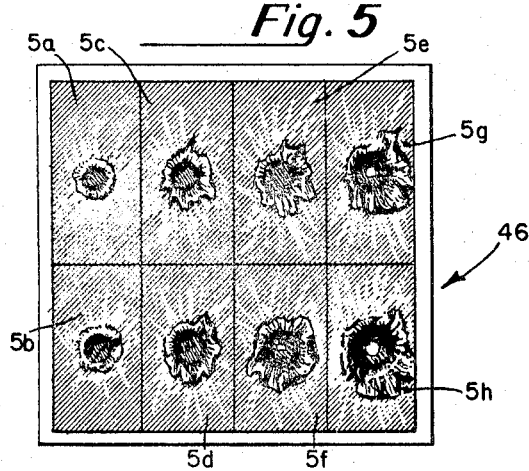
Fig. 5
INVENTOR.
Jacob L. Bohn
BY
Paul + Paul
ATTORNEYS.

HIGH SPEED CAMERA

BACKGROUND OF THE INVENTION

In the past, various cameras have been developed for obtaining photographs at high speed, of various phenomena such as explosions and the like, emphasis having been placed upon obtaining extremely short exposure times, along with a time lapse between exposures, the lapse of time being short but being substantial as compared to the exposure times. Particular reference is made in this regard to U.S. Pat. No. 3,262,749 issued July 26, 1966 to Nadig et al. The camera of the above-identified patent has been highly successful, and is capable of operating at speeds of 3,000,000 frames per second and above.

SUMMARY OF THE INVENTION

The present invention is directed toward providing a camera also capable of operating at extremely high speeds, but wherein the device for directing the path of incoming light travel to the various reflection zones which comprise the multiplier grid is a moving slit, which moves in a direction generally traversing the ordinary path of light travel toward the reflection zones, and in such traversing movement slightly angularly alters the direction of the path of light travel to successive ones of the reflection zones, one after another, to produce a series of images on film or other recording means.

The principal advantages of the present invention over prior art techniques reside in economy of manufacture, wherein any of a plurality of suitable devices may be provided for moving the slit across the path of light travel, without requiring extreme precision in manufacture and assembly of the slit-moving device.

Accordingly, it is a primary object of this invention to provide a high speed camera, wherein an object image may be focused on a recording means and wherein light from an image is angularly directed in paths of travel to successive reflection zones from which the light is then reflected onto corresponding successive portions of the recording for recording the desired images, and wherein the means for moving the path of light travel from one reflection zone to another comprises a moving slit arrangement.

It is another object of this invention to accomplish the above object wherein the moving slit arrangement comprises a rotatable member having a plurality of slits adjacent its periphery.

It is a further object of this invention to accomplish the above objects, wherein the reflection zones comprise members having mirrored edges, and which are arranged to reflect light therefrom onto film or other recording medium wherein a plurality of frames may be obtained on a single film or record, during very slight movement of a slit in a direction traversing the path of light travel toward the reflection zones.

Other objects and advantages of the present invention will become readily apparent to one skilled in the art from a study of the following brief description of the drawing FIGS., detailed descriptions of the preferred embodiments, and the appended claims.

IN THE DRAWINGS

FIG. 1 is a longitudinal sectional view taken through the camera of this invention, wherein the various components thereof are schematically illustrated in position for directing light from an image to be photographed in the manner desired according to the operation of the camera of this invention.

FIG. 2 is an enlarged side elevational view in schematic form, of the moving slit device of this invention, as illustrated in FIG. 1, and drive means therefore.

FIG. 3 is a top perspective view of an assembly of reflection elements, or multiplier grid of this invention, wherein a plurality of narrow elements having mirrored edges are arranged in two groups, with each mirror in a group being angularly disposed relative to one another, as viewed in plan.

FIG. 4 is a fragmentary top plan view of the multiplier grid arrangement of FIG. 3.

FIG. 5 is an illustration of an eight-frame photograph as would be taken with the camera of this invention, the eight frames illustrating in succession, sequential pictorial phenomena happening at a high speed.

Figure 12:
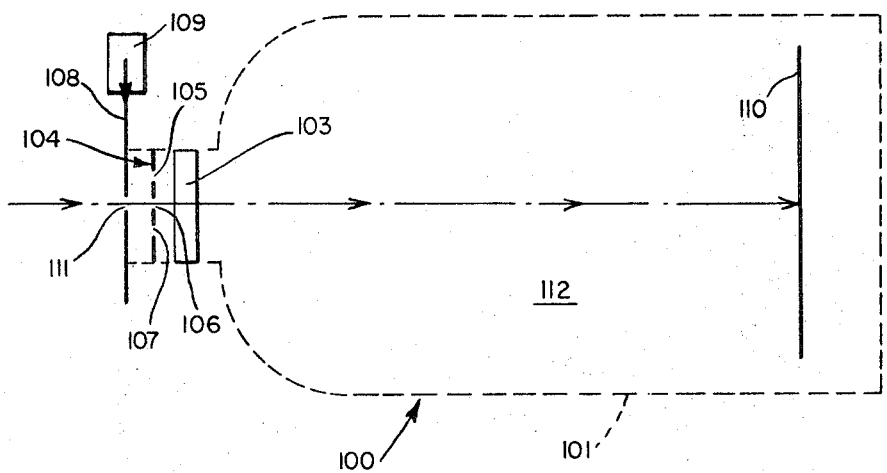

In FIG. 6 there is illustrated, in schematic form, a pair of rotatable moving slit devices, together with their respective lenses, for providing either two series of identical pictures, or for providing two distinct series of pictures in frames taken at different times during the occurrence of the phenomenon to be photographed, depending upon whether the moving slit devices are moving at the same, or different speeds respectively.

In FIG. 7 there is illustrated an additional device for providing a moving slit arrangement for the camera of this invention.

In FIG. 8 there is illustrated a moving slit device, together with a pair of lenses, whereby two identical groups of pictures of the photographed phenomenon may be recorded.

In FIG. 9 there is illustrated a portion of a strip of film, having slits therein, which, when the film is moved at a given speed, will provide a moving slit arrangement for the camera of this invention.

In FIG. 10 there is illustrated a fragmentary portion of a drivable belt having slits therein, for providing another alternative moving slit arrangement for the camera of this invention.

In FIG. 11 there is illustrated an alternative arrangement for a rotatable device for providing a moving slit arrangement, whereby the path of light travel is reflected outwardly of the rotatable device, after the light has passed through a moving slit.

In FIG. 12 there is illustrated a modified form of this invention, wherein the camera utilizes fixed and moving slit arrangements for obtaining multiple exposures on a single film, under a constant source of light.

Referring now to the drawings in detail, reference is first made to FIG. 1, wherein there is illustrated the camera of this invention generally designated by the numeral 15.

The camera 15 includes a camera body 16 for housing all inside components and shielding the inside 17 of the camera against unwanted light.

At the leftmost end of the camera 15, as viewed in FIG. 1, there is provided a focusing lens arrangement 18, which may include a focusing lens 21, generally of the objective type. Means may be provided (not illustrated) for adjusting the position of the lens 21 relative to a concave mirror 22 fixedly disposed within the interior 17 of the camera housing 16.

The rotatable moving slit device 23 is provided, within the camera body or housing 16, near the forward or leftmost end of the camera 15 as viewed in FIG. 1.

The rotatable moving slit device 23 may be carried by a sloped bottom surface portion 24 of the camera housing 16. The rotatable device 23 comprises a frustoconically configured ringlike member 25 having a disclike base 26 extending across the lowermost end of the member 25, as viewed in FIG. 2, the lowermost end being that having the smallest diameter as illustrated. The frustoconical member 25 is provided with a plurality of slits 27, each arranged generally perpendicular to adjacent edge portions of each of the lowermost and uppermost ends 26 and 28 respectively of the rotatable member 23, with the slits 27 extending through the frustoconical-shaped member 25. Generally, a great number of the slits 27 will be provided, equidistantly arcuately spaced about the periphery of the rotatable member 23, through the surface of the member 25. A shaft 30 is provided, rigidly attached or otherwise secured to the lower base 26 of the rotatable member 23, the shaft 30 being housed within a suitable motor 31 or comparable drive arrangement for providing the desired rotation to the rotatable member 23. The motor 31 may be of the magnetic motor type and provides a mounting device for the rotatable moving slit device 23 of the camera base 24. A suitable battery or other electrical source (not shown) may be provided for driving the motor 31, preferably with a variable transformer (not shown) for selectively controlling the speed of revolution of the rotatable moving slit device 23.

A pair of light shields 32 and 33 are provided, extending inwardly from sidewalls of the camera housing 16, with their respective innermost end portions 34 and 35 terminating approximately centrally of the camera housing 16 to define a fixed slit 36 therein for allowing the passage of light therethrough when a slit 27 of the device 23 is aligned with the slit 36, the shields 32 and 33 otherwise being operative to prevent excess light from entering into that side of the camera interior 17 at the right of the shields 32 and 33, as illustrated in FIG. 1.

The mirror 22 is of concave configuration, in order to have a converging effect on light reflected therefrom.

A plane mirror 37 is provided, fixedly carried by the interior of sidewall 19 of the camera housing 16, for reflecting light therefrom toward an image multiplier device 38 mounted adjacent the housing sidewall 19, against the light shield 32.

The image multiplier grid arrangement 38 comprises a block 40 of metal, such as lead or the like for fixedly and securely maintaining a plurality of narrow reflection means 41 seated therein, the reflection means 41 each being of rectangular construction and having at least one mirrored surface 42 thereon, facing in the general direction toward the rightmost end of the camera 15, as viewed in FIG. 1. The elements 41 may be constructed as mirrors, but at least the surface 42 thereof must have light reflective qualities.

With reference to FIG. 3, it will be seen that each of the elements 41 is also indicated by one of the numbers 41' or 41" in alternative fashion, depending upon whether the reflective surface 42 thereof is tilted with its upper end disposed rearwardly or adjacent to the forward surface 43 of the block 40, or if the uppermost end of the reflected surface 42 is tilted forwardly or away from the surface 43 of the block 40, respectively. Thus, the elements 41 are disposed such that alternate ones of such elements would reflect light transmitted thereto from a direction normal to the surface 43 of the block 40 either upwardly or downwardly, for a reason later to be discussed herein.

It will also be noted, with particular reference to FIG. 4, that the elements are disposed in angular relationship relative to one another such that the forward reflective surfaces 42, of each of the upwardly tilted elements 41' when taken together described a generally circular or other arcuate configuration, as viewed from an upper end thereof, substantially as viewed in FIG. 4. Similarly, the reflective surfaces 42 of the downwardly tilted elements 41" comprise a group (as in in FIG. 4) which, when viewed in plan is of generally arcuate or circular configuration, as defined by the aggregate locus of points forming edges of their surfaces 42, as viewed from an upper end thereof.

A focusing lens 45 generally of the convex or objective type is mounted for cooperation with the concave mirror 22 for facilitating the focusing of an image reflected from a reflection surface 42 of a reflecting element 41 onto a recording means 46, generally of the photographic film type disposed at the rightmost end of the camera 15. A cartridge 47 is provided at the rightmost end of the camera 15, as viewed in FIG. 1, wherein a plurality of photographic film strips 46 are disposed in stacked relation, within a cuplike retainer 48. A biasing means 50 of the spring type is provided for biasing the retainer 48 with its film strips 46, away from the extreme end 51 of the cartridge 47.

The film strips 46 are readily dispensable through an opening 52 in the cartridge 47, at one side thereof, after exposure. The film strips are consecutively urged into forwardmost relation due to the pressure exerted by the spring 50 against the retainer 48, as each endmost film strip 46 is dispensed through the slot 52. It is to be noted that the film strips 46 may be of the conventional type or may be adapted for immediate presentation of a readily observable image thereon, such as is identified by photographic techniques of the type identified by the "Polaroid" trademark.

In FIG. 5 there are illustrated eight frames which comprise a pictorial presentation or a sequence of pictures taken by light reflected from each of the elements 41 of the multiplier grip 38. The pictures represent successive stages photographed of a bullet piercing a lead plate. The pictures taken are illustrated in sequence in the frame 5a, 5b, 5c, 5d, 5e, 5f, 5g, and 5h.

OPERATION

The operation of the camera 15 of this invention is as follows, to take pictures at rates of 110,000 frames per second and above. The camera 15 is fixedly mounted, generally on a tripod or the like, being loaded with film strips 46, preferably of the type identified by the trademark "Polaroid." A sight (not illustrated) may be mounted above the camera for correctly aiming or aligning the camera 15 with the event to be photographed. Such an event, for example a bullet piercing a metal plate generally occurs beyond the leftmost end of the camera 15, as illustrated in FIG. 1, a predetermined distance therefrom, and the room in which the camera is being operated is preferably darkened. If the phenomenon being photographed is of the type which will provide sufficient light itself for the photographic process no further illumination is required. If the event is nonluminous a source of illumination of the approximate duration for a series of photographs is required. This is easily accomplished by triggering a xenon lamp with its associated capacitor of predetermined size and voltage. For example, a bullet could do the triggering and the result would be as shown in FIG. 5. The lens 21 is then adjusted to focus the object being photographed on or near the concave mirror 22. The motor 31 is then energized, for rotating the slit moving means 23 at a desired speed, which has been precalculated to correspond with the time interval in which the event to be photographed will take place. This speed at any given time is precisely determined, for example, by a magnetic "pick up" connected to the rotatable disc 23 in a conventional manner for transmitting a signal indicating the speed to an oscilloscope, or by any other suitable means. The camera and its lens system is set to focus the object image through the lens 21, mirror 22, and mirrored surfaces 42 onto corresponding various frame portions of the recording means 46. Light from the image is focused by the lens 21 through a slit 27 as that slit 27 traverses the path of light travel indicated by the arrows in FIG. 1, and passes through the opening 36 between the light shields 32 and 33 focusing the object image on the concave mirror 22. The object image is reflected from the mirror 22, off the plane mirror 37, off one of the mirrored surfaces 42 of an element 41 of the image multiplier grid 38, and through the lens 45, which focuses the slit image onto a corresponding portion of the film 46 in that the mirror 22 forms an image of the moving slit successively on the smaller mirrors 42.

As a given slit 27 traverses the path of light through the opening 36, during a very slight but rapid angular rotation of the rotatable slit moving means 23, light from the slit strikes the concave reflecting mirror 22, from slightly different directions as the slit moves, such light then being reflected off of the plane mirror 37, striking and traversing a portion of the mirror 37 as indicated, the light then traversing in sequential order, a forward face 42 of each element 41 of the image multiplier grid 38 to be finally reflected through the lens 45, and onto specific frames or portions of the film 46 which correspond each to a specific one of the mirrored element faces 42.

The elements 41 have been carefully preset, and accurately spaced and arranged relative to the individual frame portions of the film 46, such that, as a single slit 27 traverses the path of light travel indicated by the arrowed lines in FIG. 1, the light is reflected in the manner above-described, such that, as a given slit 27 begins to cross the slit opening 36, the light which is permitted to pass therethrough and be reflected off the concave mirror 22 and the plane mirror 37, is reflected off of the mirrored surface 42 of the element 41a, to form the frame image designated by the numeral 5a in FIG. 5 on the film 46. Similarly, as that same slit 27 traverses a little farther across the path of light travel, to become a little more fully aligned with the slit or opening 36, light is reflected from the mirrors 22 and 37 onto the reflecting surface 42 of mirror element 41b, and is thus directed in a manner divergent relative to the direction of light from the surface 42 of the mirror 41a, such that the corresponding image formed on the film strip 46 becomes vertically aligned above the image formed by reflection off the element 41a, such that the two frames appear adjacent each other, with the frame formed by light from the element 41b above the frame formed by light from the element 41a as viewed in FIG. 1, or with the corresponding picture formed by light from the element 41b being indicated by the picture 5b which is positioned below the corresponding picture 5a formed by light reflecting from the element 41a. It will be noted that each pair of elements, for example, 41a and 41b which causes frames to be disposed above or below one another as for example are the frames 5a and 5b of the picture illustrated in FIG. 5, must be angularly orientated a slight amount to converge their respective reflections, as viewed in plan, in FIG. 4, but such is not an amount which would be noticeable in the arrangement of FIG. 4 due to the small scale of the illustration. Also, it will be noted that light reflected from the surfaces 42 of each of the elements 41a and 41b is divergent relative to light reflected from the other, in order to place frames 5a and 5b one above the other. Similarly, light is reflected sequentially from a surface 42 of each of the other elements 41c through 41h, resulting in corresponding pictorial representations, or frames 5c through 5h.

It will be apparent that any number of elements 41 may be utilized, resulting in a corresponding number of picture frames on the film 46, the limitation being only that number of corresponding frames which may be simultaneously placed upon a single film 46, in which the pictorial representation may be readily distinguishable.

While only a slit 27 is utilized to produce a plurality of frames or sequential images on a given strip of film 46, the great number of slits 27 illustrated about the frustoconical member 25 assures that, at any given instant, a slit will be at or near position for initiating a photographic sequence.

Also, while the particular angular relationship, orientation and structural configuration of each element 41 has been discussed above in detail, it should be apparent that any desired placement or orientation of elements 41 may be utilized, which will direct light reflected therefrom onto desired portions of the film 46.

It will further be noted that it is convenient to utilize the lens 21 to focus an image directly on the concave mirror 22, whereby the size of the mirror 22 and the lens 45 may determine the size of the final image on the film 46.

As an alternative to using the curved mirror 22, it will be apparent to those skilled in the art that the mirror 22 can be replaced by a focusing lens and a plane mirror.

Still another alternative construction resides in eliminating the plane mirror 37, and moving the mirror 22, back toward the film, to pass the slit image first forwardly through the lens 45 to the mirrored surface 42, then reflecting the slit images back through the lens 45 from the mirrored surfaces 42 toward applicable portions of the recording means 46.

With reference to FIG. 6, there is illustrated an alternative arrangement for rotatable slit-moving means of this invention, wherein a plurality of moving slit devices 50 and 51, with their respective associated lens systems 52 and 53 (schematically illustrated) may be utilized to obtain the photographing of phenomena at two different speeds; indicated as speeds of rotation $R_1$ and $R_2$, respectively. Thus, intermediate pictorial representations could be obtained between other desired pictorial representations, or in those instances where the expected speed of the phenomena occuring could not be readily predetermined, multiple systems would be present for photographing the phenomena at a plurality of speeds, with each rotatable slit arrangement being positioned for directing light passing through a slit 54, or 55 thereof, off successive associated multiple reflection means onto associated recording means 56 and 57. The multiple systems illustrated schematically in FIG. 6, adapted for photography at a plurality of different speeds as discussed above may each be of the specific system arrangement of FIG. 1, or in the alternative, could be condensed somewhat where desirable. Also, various other reasons may be present for photographing phenomena at different speeds, such as, for example, discovering effects which may be noticeable only at specific speeds.

Referring to FIG. 7, there is illustrated an alternative slit-moving device of this invention generally designated by the numeral 58, wherein a shaft 60 is driven in some conventional manner, as by a motor 59, and is arranged with its axis of rotation generally parallel to the direction of light which is to pass through a slit thereof, as illustrated in FIG. 7, the shaft 60 having a disc 61 secured thereto, the disc 61 having a plurality of radially disposed slots 62 therein. The device 58 of FIG. 7 is operative in much the same manner as is the device 23 of FIG. 2, such that when a given slit 62 traverses the light path indicated by the straight line arrows in FIG. 7, the position of light reflecting off a corresponding concave mirror such as that 22 illustrated in FIG. 1 is altered in a manner similar to the change in direction of light which is effected by the movement of a slit 27 of the device 23.

In FIG. 8 there is illustrated another alternative arrangement for a rotating slit arrangement, generally designated by the numeral 64. The device 64 comprises a frustoconically configured member 65, which is arranged to receive passing therethrough, two rays of light from a phenomena being photographed, both rays passing concurrently through a single slit 66, and through lens systems 67 and 68 (schematically illustrated) to include lenses and suitable reflection means as described herein, whereby phenomena may be recorded on multiple recording means 69 and 69', such that a pair or more of identical pictorial representations could be obtained of a particular occurrence, if desired upon rotation of the member 64 as driven by a suitable drive means 63.

It is also conceivable that ordinary film, such as movie film or the like, could be provided with a plurality of slits such as those 70 on the film strip 71 of FIG. 9, with the film strip 71 being driven for traversal of the slits 70 across a light path, generally similar to the traversal of a slit 27 across the light path indicated in FIG. 1. Any suitable film reeling device such as conventional outlet and takeup means 72a and 72b respectively, with drive means 72c therefor, as is schematically illustrated in FIG. 9 may be utilized instead of the member 23 of FIG. 1 and its drive means.

In FIG. 10 there is illustrated an arrangement generally similar to that of FIG. 9, but wherein a drivable belt 73 is provided, having teeth 74 on one side thereof for engagement by a drive wheel 76a and conventional idler 76b, or the like, and with the wheel 76a being driven by suitable drive means 76c having a plurality of slits 75 extending transversely thereof, the belt 73 being capable of being driven in a manner generally similar to that of the film strip 71 of FIG. 9 and being replaceable in the camera of FIG. 1 for the member 23 and its drive means.

In FIG. 11 there is illustrated a further alternative arrangement for a rotating slit moving means, comprising a device generally designated by the numeral 77, wherein the cylindrical surface 78 thereof is of right-circular cylindrical configuration, having slits 80 therein disposed generally perpendicular to a baseplate 81 which substantially closes one end of the cylindrical member 78, the baseplate 81 being mounted for rotation with a shaft 82, and being drivable by any suitable motor arrangement 86, such as that illustrated in FIG. 2. It will be noted that the beam of light indicated by the arrow 83 passing through a slit 80 of the device 77 passes generally perpendicular to the axis or rotation of the shaft 82. Without more, the light would pass through two oppositely disposed slits 80. Consequently, it becomes necessary to provide a mirror 84 or other suitable reflecting means for reflecting the image-carrying light outwardly of the cylinder 78. An additional mirror 85 may also be provided, if desired, for redirecting the light into a path of travel generally parallel to that which it had upon entering the device 78. Also, the direction of light travel could be the reverse of that illustrated, without departing from the spirit of this invention, it then being necessary to transpose the multiplier grid arrangement to correspond therewith. It will also be apparent that the device of FIG. 11 would replace only the rotatable device 23 illustrated in FIG. 2, if desired, and that all other essential components of the camera 15 illustrated in FIG. 1 would be utilized with the device 77 of FIG. 11 with the lens 21, of course, being merely adjusted in its position to be in line with the beam of incoming light indicated by the arrow 83 in FIG. 11.

With particular reference to FIG. 12, there is illustrated a camera 100 which is adapted to take multiple exposures on the same film, wherein an inexpensive and constant source of light may be used, in distinction to prior art multiple exposure techniques which generally required that use of strobe lights. The camera 100 comprises a camera body 101, utilizing a focusing lens 103, and has recording means 110, of the photographic film type disposed therein as illustrated schematically, but which may, of course, be of the type disclosed in FIG. 1, if desired. Light is precluded from the inside 112 of the camera 100. A fixed slit device 104 is provided having a plurality of fixed slits 105, 106, 107.

A moving slit means 108, having a slit 111 is provided forwardly of and adjacent to the fixed slit device 104, for traversing the slits, 105, 106 and 107 in serial or sequential fashion in response to movement provided by moving means 109, to allow light to enter the camera through the lens 103 to sequentially strike the recording means 110. Thus, several exposures of a moving event, for example of a bullet in flight, may be photographed under a source of constant light directed at the bullet, and the light may then pass through one of the slits 105, 106, 107, onto the film recording means 110, as the moving slit 111 traverses the path of light travel, in front of the slits 105, 106 and 107, one after the other, in its movement, as for example, as indicated by the arrow in FIG. 12. The moving slit means 108 may be constructed as illustrated in FIG. 2 or by any other suitable means.

It will be apparent that various modifications may be made in the various structural elements, and in their combination without departing from the spirit and scope of this invention. Also, various modifications may be made in the use of the invention, other than the particular preferred uses set forth herein. For example, any means for propelling a moving slit may be utilized, such as an explosive-propelled moving slit arrangement, for achieving an extremely high velocity slit movement. Such explosion could be triggered to the occurrence of the phenomena to be photographed, for example by triggering the phenomena to be photographed from the explosion which provides the movement for the moving slit. Accordingly, all such modifications may be made within the spirit and scope of this invention, as defined in the appended claims.

I claim:

1. A high speed camera comprising a means defining light path travel from an object being photographed to an image recording means; said former means including lens means for focusing images on image recording means, a plurality of reflection means disposed in the path of light travel for sequentially receiving and directing light onto sequential portions of said recording means in response to changes in the path of light travel, and moving slit means disposed in the path of light travel for traversing said path of light travel and for producing corresponding changes in the path of light travel.

2. The apparatus as defined in claim 1, wherein said reflection means comprise reflective elements corresponding in number to frame portions of said recording means.

3. The apparatus as defined in claim 1, wherein said reflection means include a plurality of narrow mirror-edged elements angularly arranged relative to each other with at least some of the mirror-edged portions disposed to collectively define a convex locus of points whereby light rays reflected from said mirror-edged portions are divergent relative to each other.

4. The apparatus as defined in claim 1, wherein said reflection means include at least two groups of narrow mirror-edged elements, said elements being arranged for reflection of light onto said recording means in two corresponding adjacent rows.

5. The apparatus as defined in claim 1, wherein said elements in each group are arranged with their mirror-edged portions angularly disposed relative to each other, with at least some of the mirror-edged portions disposed to collectively define a locus of points whereby light rays reflected from said portions are divergent relative to each other for serial reflection of light onto said recording means in the form of a row of frames.

6. The apparatus as defined in claim 1, wherein said moving slit means comprises a rotatable member having a plurality of slits for traversing the path of light travel.

7. The apparatus as defined in claim 6, wherein said slits are arranged near the periphery of said rotatable member for transmission of light from an image to be photographed through a slit in a direction substantially normal to the disposition of said slit as said slit traverses the path of light travel.

8. The apparatus as defined in claim 7, wherein said rotatable member has a periphery of frustoconical configuration with the slits arranged perpendicular to opposite ends thereof.

9. The apparatus as defined in claim 7, wherein said rotatable member comprises a disc having an axis of rotation substantially parallel to the path of light travel, with said slits being radially directed.

10. The apparatus as defined in claim 7, wherein said rotatable member comprises a cylindrical shell-like configuration.

11. The apparatus as defined in claim 10, wherein said rotatable member has reflection means at least partially disposed therein for altering the direction of the path of light travel for precluding light in its path of travel from passing through more than one slit simultaneously.

12. The apparatus as defined in claim 1, wherein said moving slit means comprises a drivable belt having a plurality of parallel slits therein for serially traversing the path of light travel.

13. The apparatus as defined in claim 1, wherein said moving slit means comprises a drivable film strip having a plurality of parallel slits therein for serially traversing the path of light travel.

14. The apparatus as defined in claim 1, wherein said moving slit means comprises at least two rotatable members, each having its own lens means.

15. The apparatus as defined in claim 14, wherein said rotatable members are drivable at the same speed for producing concurrent images on said recording means.

16. The apparatus as defined in claim 14, wherein said rotatable members are drivable at different speeds for sequentially producing images on said recording means at different speeds.

17. The apparatus as defined in claim 1, wherein said recording means comprises photographic film for receiving and recording images in an observable state.

18. The camera of claim 1, wherein said lens means comprises a first focusing lens through which light entering the camera first passes, mirror means for directing light onto said reflection means, and a second lens between said reflection means and said recording means for determining the size of the final image on said recording means; wherein said reflection means include at least two groups of narrow mirrored elements, said elements being arranged for reflection of light onto said recording means in two corresponding adjacent rows; wherein said elements in each group are arranged with their mirrored portions angularly disposed relative to each other, with at least some of the mirrored portions disposed to collectively define a locus of points whereby light rays reflected from said portions are divergent relative to each other for serial reflection of light onto said recording means in the form of a row of frames; wherein said moving slit means comprises a rotatable member having a plurality of slits for traversing the path of light travel; wherein said slits are arranged near the periphery of said rotatable member for transmission of light from an object to be photographed through a slit in a direction substantially normal to the disposition of said slit as said slit traverses the path of light travel; wherein said rotatable member has a periphery of frustoconical configuration with the slits arranged perpendicular to opposite ends thereof; and wherein said recording means comprises photographic film for receiving and recording images in an observable state.